(12) United States Patent
Candelore (10) Patent No.: US 12,505,150 B2
(45) Date of Patent: Dec. 23, 2025

(54) REALTIME CONTENT METADATA CREATION USING AI

(71) Applicant: Sony Group Corporation, Tokyo (JP)

(72) Inventor: Brant Candelore, Poway, CA (US)

(73) Assignee: Sony Group Corporation, Tokyo (JP)

( * ) Notice: Subject to any disclaimer, the term of this patent is extended or adjusted under 35 U.S.C. 154(b) by 35 days.

(21) Appl. No.: 18/304,240

(22) Filed: Apr. 20, 2023

(65) Prior Publication Data

US 2024/0354327 A1 Oct. 24, 2024

(51) Int. Cl.
*G06F 16/435* (2019.01)
*G06F 16/438* (2019.01)
*G06F 16/487* (2019.01)
*G06N 3/08* (2023.01)

(52) U.S. Cl.
CPC .......... *G06F 16/435* (2019.01); *G06F 16/438* (2019.01); *G06F 16/487* (2019.01); *G06N 3/08* (2013.01)

(58) Field of Classification Search
CPC .... G06F 16/435; G06F 16/438; G06F 16/487; G06N 3/08
USPC ........................................................ 707/722
See application file for complete search history.

(56) References Cited

U.S. PATENT DOCUMENTS

| | | | | |
|---|---|---|---|---|
| 2004/0021673 | A1* | 2/2004 | Alessi | G06F 3/0481 345/619 |
| 2010/0241351 | A1* | 9/2010 | Meisels | G06F 16/29 715/810 |
| 2012/0011137 | A1* | 1/2012 | Sheha | H04L 67/52 707/E17.014 |
| 2014/0379694 | A1* | 12/2014 | Denise | G06F 16/951 707/722 |
| 2015/0220479 | A1* | 8/2015 | Hwang | G06F 15/0291 715/776 |
| 2015/0382079 | A1* | 12/2015 | Lister | H04N 5/783 725/38 |
| 2017/0103136 | A1* | 4/2017 | Keohane | G06F 16/951 |
| 2017/0118523 | A1* | 4/2017 | Gupta | H04N 21/278 |
| 2017/0311040 | A1 | 10/2017 | Barnes | |
| 2019/0052926 | A1* | 2/2019 | Waterman | H04N 21/8455 |
| 2019/0228339 | A1 | 7/2019 | Kim et al. | |
| 2019/0342419 | A1* | 11/2019 | Bromand | H04N 21/41422 |
| 2019/0351331 | A1 | 11/2019 | Betzel et al. | |
| 2019/0394147 | A1* | 12/2019 | Rodriguez | H04L 51/046 |
| 2020/0103245 | A1* | 4/2020 | Bourque | G06F 16/954 |
| 2020/0251089 | A1* | 8/2020 | Pinto | A63F 13/54 |
| 2021/0173836 | A1 | 6/2021 | Robert Jose | |
| 2021/0263891 | A1 | 8/2021 | Bellingham et al. | |
| 2021/0374179 | A1 | 12/2021 | Aher | |
| 2023/0118824 | A1* | 4/2023 | Jackson, Jr. | H04N 21/23424 725/38 |
| 2024/0179193 | A1* | 5/2024 | Maurer | G06N 3/08 |

* cited by examiner

*Primary Examiner* — Cam Y T Truong
(74) *Attorney, Agent, or Firm* — John L. Rogitz; John M. Rogitz (57) ABSTRACT

A user query for information related to an audio video (AV) program is received and processed by a machine learning (ML) model such as an artificial intelligence (AI) chatbot. The chatbot returns a response to the query in conversational form. To ensure the chatbot does not spoil the ending for a user in the middle of the AV program, the chatbot is fed only portions of corresponding text up to the time the user is in viewing.

15 Claims, 8 Drawing Sheets

Server

Server

A/V Player

REALTIME CONTENT METADATA CREATION USING AI

FIELD

The present application relates to technically inventive, non-routine electronic glossary solutions that are necessarily rooted in computer technology and that produce concrete technical improvements, particularly to realtime content metadata creation using AI.

BACKGROUND

Audio video (AV) content typically features many real life and/or imaginative characters and plots. Some people may have difficulty remembering all the details of a lengthy AV show.

Searching may be performed to fill in details that may have been forgotten. But searching the Internet requires the input of effective search terms and moreover may not lead to relevant information in a "hit or miss" process requiring the user to peruse multiple links which may or may not contain accurate or complete information.

SUMMARY

Present principles understand that providing metadata for AV content to be used in responding to viewer queries is that it usually requires someone to create it which can be very time-consuming process and require a great deal of effort to anticipate the questions and possible responses. The responses may further require output in audible form, requiring text-to-speech conversion to recite the responses aloud to the viewer. Present principles further understand that this problem is exacerbated for less popular works.

As further understood herein, the above considerations may be addressed by creating metadata in an automated way using artificial general intelligence (AGI) such as a machine learning (ML) model such as a chatbot to seek out metadata from a large corpus of documents, and then train on the metadata to process viewer (user) queries about AV content. However, present principles recognize that in so doing, it is possible for a chatbot to spoil the end of an AV show a viewer might be in the middle of, since the chatbot typically will be trained on documents covering the entirety of the show.

Accordingly, present principles are directed, from one perspective, to backend servers working in conjunction with content players such as Netflix, Prime Video, Audible, etc. running on client devices. A server receives requests for information related to content such a movie, show, TV series, eBook, or audio book. The server uses chatbot technology, such as ChatGPT4, that uses a large language model (LLM) trained AGI to scan available textual information to fashion a response.

For example, while consuming AV content, the user may ask a question about a character in the content. This is recognized as a query by the content player and relayed to the server along with a current playback location in the content. The server may have access to an overall summary of the content, possibly a broad synapsis, but not detailed summaries of individual parts of the content. It may therefore be required to "load" an ML model or GAI model (such as a chatbot) with all available printed information about the content to formulate a more detailed response to the query. However, so as not to provide a response that spoils the content for the user, the AI is either loaded with relevant documents only up to a point in the content corresponding the current playback location of the user, or is programmed to ignore, in formulating a response, any loaded information related to the AV content that pertains to portions of the AV content after the current playback location of the user. The response is then provided to the content player of the user to respond to the query.

In an aspect, an apparatus includes at least one computer memory that is not a transitory signal and that in turn includes instructions executable by at least one processor to present audio video (AV) content on a display. The instructions are executable to receive at least one query related to the AV content, and send the query to at least one server along with an indication of a current location in the AV content. The server executes at least one machine learning (ML) model. The instructions are executable to receive from ML model a response to the query.

In example embodiments the apparatus can also include the server, which can include at least one processor configured to receive the query and the indication of the current location, and execute the ML model to generate a response containing information about the AV content only up to the current location.

In some implementations, the processor of the server can be configured to, responsive to the query, search a corpus of documents for information related to the AV content. The processor can gather only portions of documents in the corpus relating to the AV content up to the current location and so train the ML model on the portions of documents in the corpus relating to the AV content up to the current location. The processor may be configured to execute the ML model to generate the response.

In other implementations, the processor of the server can be configured to, responsive to the query, search a corpus of documents for information related to the AV content, and gather documents in the corpus relating to the AV content. The processor can be configured to train the ML model on the documents in the corpus relating to the AV content. In these implementations, the processor can be configured to execute the ML model to generate the response using only portions of the documents up to the current location. To this end, the processor of the server may be configured to train the ML model using only portions of the documents up to the current location.

In still other implementations, the processor of the server may be configured to, prior to the query, search a corpus of documents for information related to the AV content and gather documents in the corpus relating to the AV content. The processor of the server can be configured to train the ML model on the documents in the corpus relating to the AV content. The processor may execute the ML model to generate a set of responses for each of the plural candidate queries. Each set of responses includes plural responses, and each of the plural responses corresponds to a respective location in the AV content, with each respective location being a location in a sequence of terms and/or sounds and/or images in the AV content. The processor of the server can be executable to receive the query and the indication of the current location, and select a respective response from a respective set of responses for a candidate query most closely matching the query and the current location for returning that respective response to the user system.

The ML model may include at least one generative pre-training transformer.

In another aspect, a method includes presenting on a display audio video (AV) content. The method includes receiving a query related to the AV content, sending the query and a current location in the AV content to at least one server on a wide area network, and presenting a response from the server to the query.

In another aspect, an apparatus such as a server includes at least one processor configured to receive from at least one user system at least one query related to audio video (AV) content and an indication of a current location in the AV content. The processor is configured to execute a machine learning (model) to generate a response containing information about the AV content only up to the current location, and return the response to the user system.

The details of the present application, both as to its structure and operation, can best be understood in reference to the accompanying drawings, in which like reference numerals refer to like parts, and in which:

DETAILED DESCRIPTION

This disclosure relates generally to computer ecosystems including aspects of computer networks that may include consumer electronics (CE) devices. A system herein may include server and client components, connected over a network such that data may be exchanged between the client and server components. The client components may include one or more computing devices including portable televisions (e.g., smart TVs, Internet-enabled TVs), portable computers such as laptops and tablet computers, and other mobile devices including smart headphones, smart phones and additional examples discussed below. These client devices may operate with a variety of operating environments. For example, some of the client computers may employ, as examples, operating systems from Microsoft, or a Unix operating system, or operating systems produced by Apple Computer or Google. These operating environments may be used to execute one or more browsing programs, such as a browser made by Microsoft or Google or Mozilla or other browser program that can access websites hosted by the Internet servers discussed below.

Servers and/or gateways may include one or more processors executing instructions that configure the servers to receive and transmit data over a network such as the Internet. Or, a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security.

As used herein, instructions refer to computer-implemented steps for processing information in the system. Instructions can be implemented in software, firmware or hardware and include any type of programmed step undertaken by components of the system.

A processor may be a general-purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example ecosystem 10 is shown, which may include one or more of the example devices mentioned above and described further below in accordance with present principles. The first of the example devices included in the system 10 is a consumer electronics (CE) device configured as an example primary display device, and in the embodiment shown is an audio video display device (AVDD) 12 such as but not limited to an Internet-enabled TV with a TV tuner (equivalently, set top box controlling a TV). The AVDD 12 may be an Android®-based system. The AVDD 12 alternatively may also be a computerized Internet enabled ("smart") telephone, a tablet computer, a notebook computer, a wearable computerized device such as e.g., computerized Internet-enabled watch, a computerized Internet-enabled bracelet, other computerized Internet-enabled devices, a computerized Internet-enabled music player, computerized Internet-enabled headphones, a computerized Internet-enabled implantable device such as an implantable skin device, etc. Regardless, it is to be understood that the AVDD 12 and/or other computers described herein is configured to undertake present principles (e.g., communicate with other CE devices to undertake present principles, execute the logic described herein, and perform any other functions and/or operations described herein).

Figure 1:
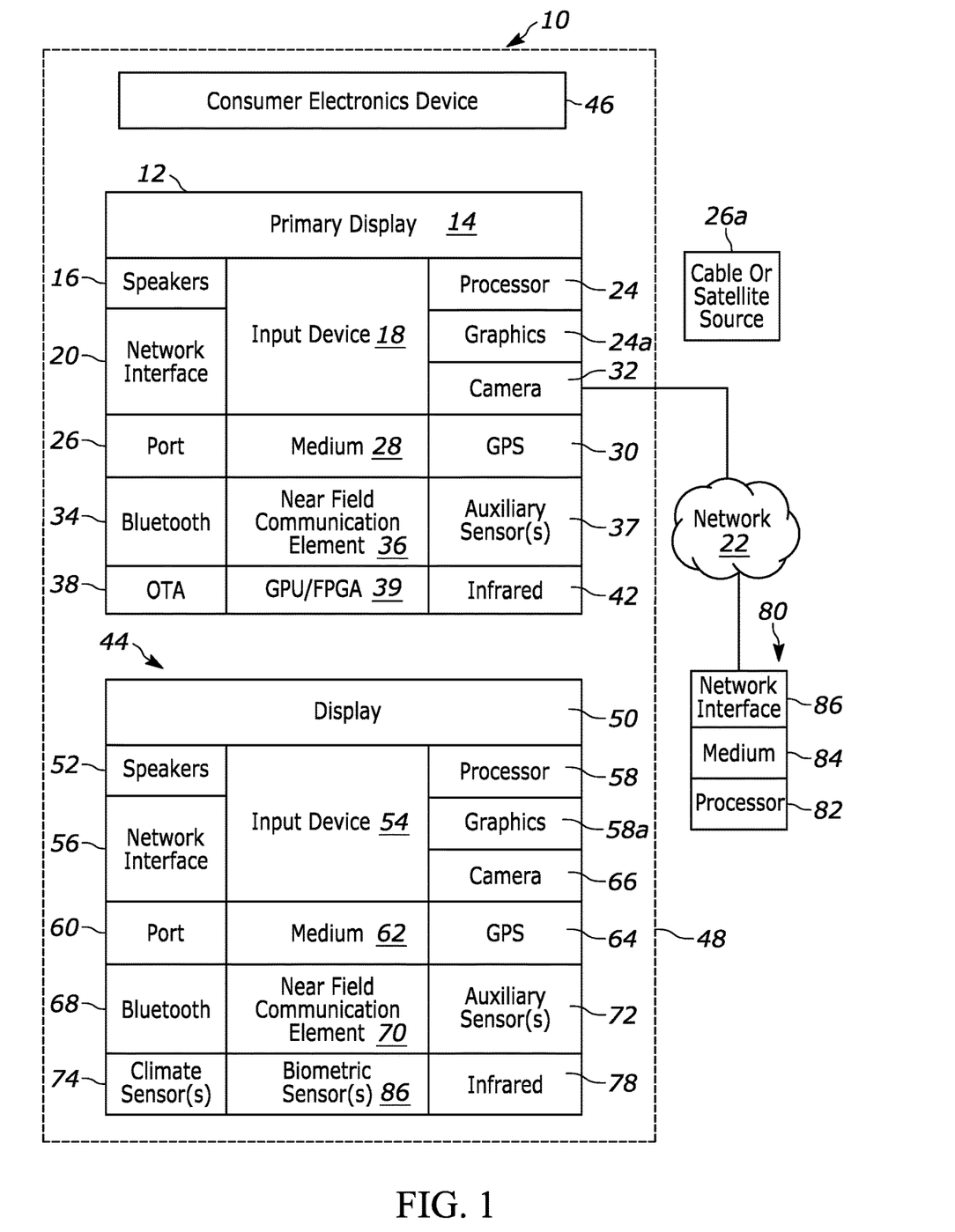
FIG. 1 is a block diagram of an example system in accordance with present principles.

Accordingly, to undertake such principles the AVDD 12 can be established by some, or all of the components shown in FIG. 1. For example, the AVDD 12 can include one or more displays 14 that may be implemented by a high definition or ultra-high definition "4K" or higher flat screen and that may or may not be touch-enabled for receiving user input signals via touches on the display. The AVDD 12 may also include one or more speakers 16 for outputting audio in accordance with present principles, and at least one additional input device 18 such as e.g., an audio receiver/microphone for e.g., entering audible commands to the AVDD 12 to control the AVDD 12. The example AVDD 12 may further include one or more network interfaces 20 for communication over at least one network 22 such as the Internet, an WAN, an LAN, a PAN etc. under control of one or more processors 24. Thus, the interface 20 may be, without limitation, a Wi-Fi transceiver, which is an example of a wireless computer network interface, such as but not limited to a mesh network transceiver. The interface 20 may be, without limitation a Bluetooth transceiver, Zigbee transceiver, IrDA transceiver, Wireless USB transceiver, wired USB, wired LAN, Powerline or MoCA. It is to be understood that the processor 24 controls the AVDD 12 to undertake present principles, including the other elements of the AVDD 12 described herein such as e.g., controlling the display 14 to present images thereon and receiving input therefrom. Furthermore, note the network interface 20 may be, e.g., a wired or wireless modem or router, or other appropriate interface such as, e.g., a wireless telephony transceiver based on 5G, or Wi-Fi transceiver as mentioned above, etc.

In addition to the foregoing, the AVDD 12 may also include one or more input ports 26 such as, e.g., a high-definition multimedia interface (HDMI) port or a USB port to physically connect (e.g., using a wired connection) to another CE device and/or a headphone port to connect headphones to the AVDD 12 for presentation of audio from the AVDD 12 to a user through the headphones. For example, the input port 26 may be connected via wire or wirelessly to a cable or satellite source 26a of audio video content. Thus, the source 26a may be, e.g., a separate or integrated set top box, or a satellite receiver. Or, the source 26a may be a game console or disk player.

The AVDD 12 may further include one or more computer memories 28 such as disk-based or solid-state storage that are not transitory signals, in some cases embodied in the chassis of the AVDD as standalone devices or as a personal video recording device (PVR) or video disk player either internal or external to the chassis of the AVDD for playing back AV programs or as removable memory media. Also, in some embodiments, the AVDD 12 can include a position or location receiver such as but not limited to a cellphone receiver, GPS receiver and/or altimeter 30 that is configured to e.g., receive geographic position information from at least one satellite or cellphone tower and provide the information to the processor 24 and/or determine an altitude at which the AVDD 12 is disposed in conjunction with the processor 24. However, it is to be understood that that another suitable position receiver other than a cellphone receiver, GPS receiver and/or altimeter may be used in accordance with present principles to e.g., determine the location of the AVDD 12 in e.g., all three dimensions.

Continuing the description of the AVDD 12, in some embodiments the AVDD 12 may include one or more cameras 32 that may be, e.g., a thermal imaging camera, a digital camera such as a webcam, and/or a camera integrated into the AVDD 12 and controllable by the processor 24 to gather pictures/images and/or video in accordance with present principles. Also included on the AVDD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVDD 12 may include one or more auxiliary sensors 37 (e.g., a motion sensor such as an accelerometer, gyroscope, cyclometer, or a magnetic sensor, an infrared (IR) sensor for receiving IR commands from a remote control, an optical sensor, a speed and/or cadence sensor, a gesture sensor (e.g., for sensing gesture command), etc.) providing input to the processor 24. The AVDD 12 may include an over-the-air TV broadcast port 38 for receiving OTA TV broadcasts providing input to the processor 24. In addition to the foregoing, it is noted that the AVDD 12 may also include an infrared (IR) transmitter and/or IR receiver and/or IR transceiver 42 such as an IR data association (IRDA) device. A battery (not shown) may be provided for powering the AVDD 12.

Still further, in some embodiments the AVDD 12 may include a graphics processing unit (GPU) and/or a field-programmable gate array (FPGA) 39. The GPU and/or FPGA 39 may be utilized by the AVDD 12 for, e.g., artificial intelligence processing such as training neural networks and performing the operations (e.g., inferences) of neural networks in accordance with present principles. However, note that the processor 24 may also be used for artificial intelligence processing such as where the processor 24 might be a central processing unit (CPU).

Still referring to FIG. 1, in addition to the AVDD 12, the system 10 may include one or more other computer device types that may include some or all of the components shown for the AVDD 12. In one example, a first device 44 and a second device 46 are shown and may include similar components as some or all of the components of the AVDD 12. Fewer or greater devices may be used than shown.

In the example shown, to illustrate present principles all three devices 12, 44, 46 are assumed to be members of a local network in, e.g., a dwelling 48, illustrated by dashed lines.

The example non-limiting first device 44 may include one or more touch-sensitive surfaces 50 such as a touch-enabled video display for receiving user input signals via touches on the display. The first device 44 may include one or more speakers 52 for outputting audio in accordance with present principles, and at least one additional input device 54 such as e.g., an audio receiver/microphone for e.g., entering audible commands to the first device 44 to control the device 44. The example first device 44 may also include one or more network interfaces 56 for communication over the network 22 under control of one or more processors 58. Thus, the interface 56 may be, without limitation, a Wi-Fi transceiver, which is an example of a wireless computer network interface, including mesh network interfaces. It is to be understood that the processor 58 controls the first device 44 to undertake present principles, including the other elements of the first device 44 described herein such as e.g., controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first device 44 may also include one or more input ports 60 such as, e.g., a HDMI port or a USB port to physically connect (e.g., using a wired connection) to another computer device and/or a headphone port to connect headphones to the first device 44 for presentation of audio from the first device 44 to a user through the headphones. The first device 44 may further include one or more tangible computer readable storage medium 62 such as disk-based or solid-state storage. Also in some embodiments, the first device 44 can include a position or location receiver such as but not limited to a cellphone and/or GPS receiver and/or altimeter 64 that is configured to e.g. receive geographic position information from at least one satellite and/or cell tower, using triangulation, and provide the information to the device processor 58 and/or determine an altitude at which the first device 44 is disposed in conjunction with the device processor 58. However, it is to be understood that that another suitable position receiver other than a cellphone and/or GPS receiver and/or altimeter may be used in accordance with present principles to e.g., determine the location of the first device 44 in e.g., all three dimensions.

Continuing the description of the first device 44, in some embodiments the first device 44 may include one or more cameras 66 that may be, e.g., a thermal imaging camera, a digital camera such as a webcam, etc. Also included on the first device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g., for sensing gesture command), etc.) providing input to the CE device processor 58. The first device 44 may include still other sensors such as e.g., one or more climate sensors 74 (e.g., barometers, humidity sensors, wind sensors, light sensors, temperature sensors, etc.) and/or one or more biometric sensors 76 providing input to the device processor 58. In addition to the foregoing, it is noted that in some embodiments the first device 44 may also include an infrared (IR) transmitter and/or IR receiver and/or IR transceiver 42 such as an IR data association (IRDA) device. A battery may be provided for powering the first device 44. The device 44 may communicate with the AVDD 12 through any of the above-described communication modes and related components.

The second device 46 may include some or all of the components described above.

Now in reference to the afore-mentioned at least one server 80, it includes at least one server processor 82, at least one computer memory 84 such as disk-based or solid-state storage, and at least one network interface 86 that, under control of the server processor 82, allows for communication with the other devices of FIG. 1 over the network 22, and indeed may facilitate communication between servers, controllers, and client devices in accordance with present principles. Note that the network interface 86 may be, e.g., a wired or wireless modem or router, Wi-Fi transceiver, or other appropriate interface such as, e.g., a wireless telephony transceiver.

Accordingly, in some embodiments the server 80 may be an Internet server and may include and perform "cloud" functions such that the devices of the system 10 may access a "cloud" environment via the server 80 in example embodiments. Or, the server 80 may be implemented by a game console or other computer in the same room as the other devices shown in FIG. 1 or nearby.

The devices described below may incorporate some or all of the elements described above.

The methods described herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a CD ROM or Flash drive. The software code instructions may alternatively be embodied in a transitory arrangement such as a radio or optical signal, or via a download over the Internet.

Present principles may employ various machine learning models, including deep learning models. Machine learning models consistent with present principles may use various algorithms trained in ways that include supervised learning, unsupervised learning, semi-supervised learning, reinforcement learning, feature learning, self-learning, and other forms of learning. Examples of such algorithms, which can be implemented by computer circuitry, include one or more neural networks, such as a convolutional neural network (CNN), a recurrent neural network (RNN), and a type of RNN known as a long short-term memory (LSTM) network. Support vector machines (SVM) and Bayesian networks also may be considered to be examples of machine learning models.

As understood herein, performing machine learning may therefore involve accessing and then training a model on training data to enable the model to process further data to make inferences. An artificial neural network/artificial intelligence model trained through machine learning may thus include an input layer, an output layer, and multiple hidden layers in between that that are configured and weighted to make inferences about an appropriate output.

In a specific embodiment, a ML model may employ a transformer-based neural network architecture such as a generative pre-training transformer trained on a large dataset of text and to generate human-like text, convertible to speech, in response to a query.

Figure 2:
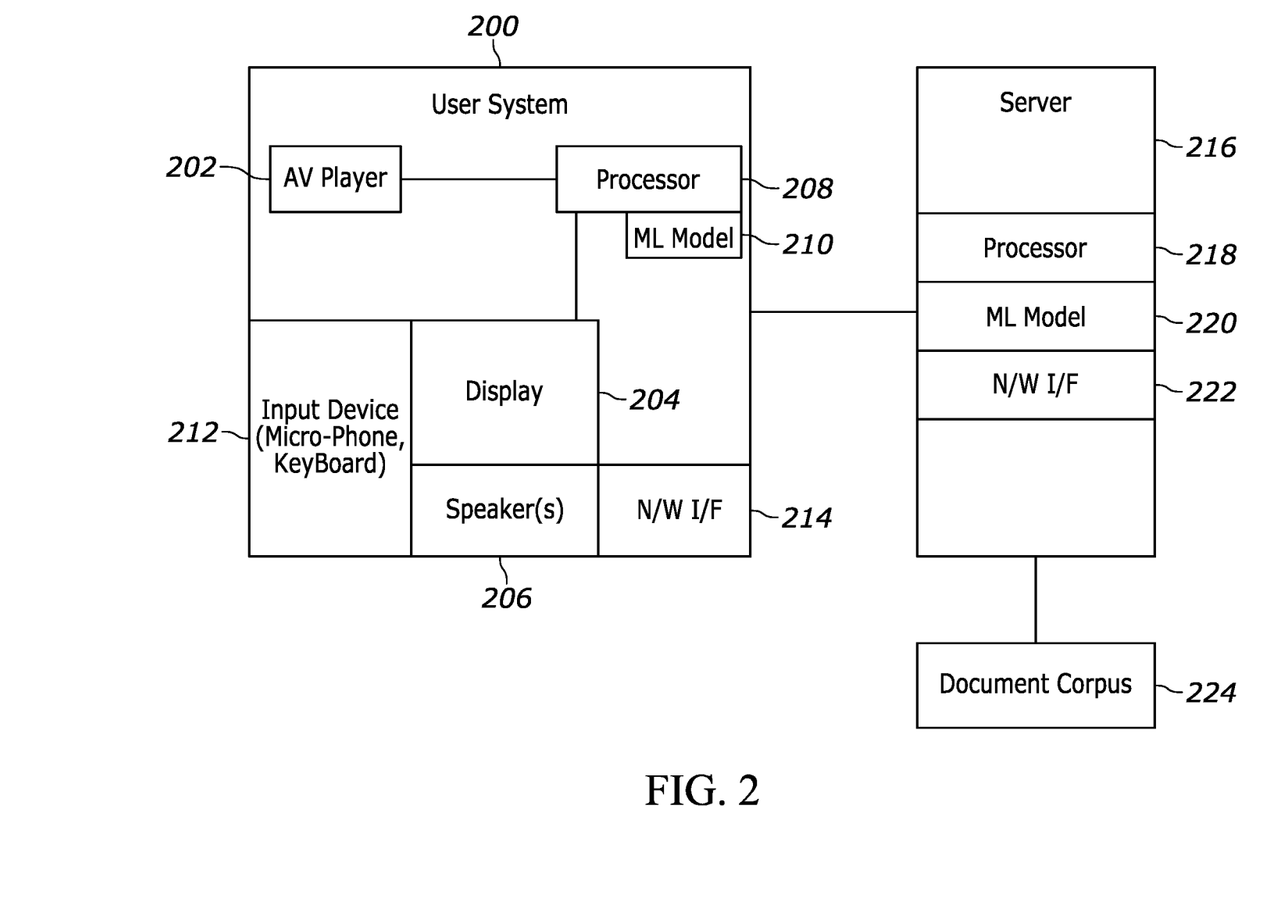
FIG. 2 illustrates an example user system with an AV player in cooperation with one or more servers.

FIG. 2 illustrates a user system 200 that may be implemented by any of the devices described above for presenting AV content sourced by an AV player 202 on a video display 204 and/or speakers 206 under control of one or more processors 208 accessing instructions on computer storage media.

The AV content can be, e.g., movies, shows, music (audio-only), text such as e-book text, and the like.

The processor 208 may execute one or more machine learning (ML) models 210 for purposes to be shortly disclosed. The processor 208 may receive queries about the AV content by means of one more input devices 212 such as microphones, key boards or key pads, etc. and send those queries via one or more network interfaces 214 to one or more Internet or other wide area network serves 216 having one or more processors 218 executing one or more ML models 220 to return responses to the queries to the user system 200 via one or more network interfaces 222. In executing the ML model, the server processor 218 may access a document corpus 224 such as network sites on the Internet. In some examples the ML model 220 of the server may be implemented by a transformer-based neural network architecture such as a generative pre-training transformer establishing a "chatbot."

Figure 3:
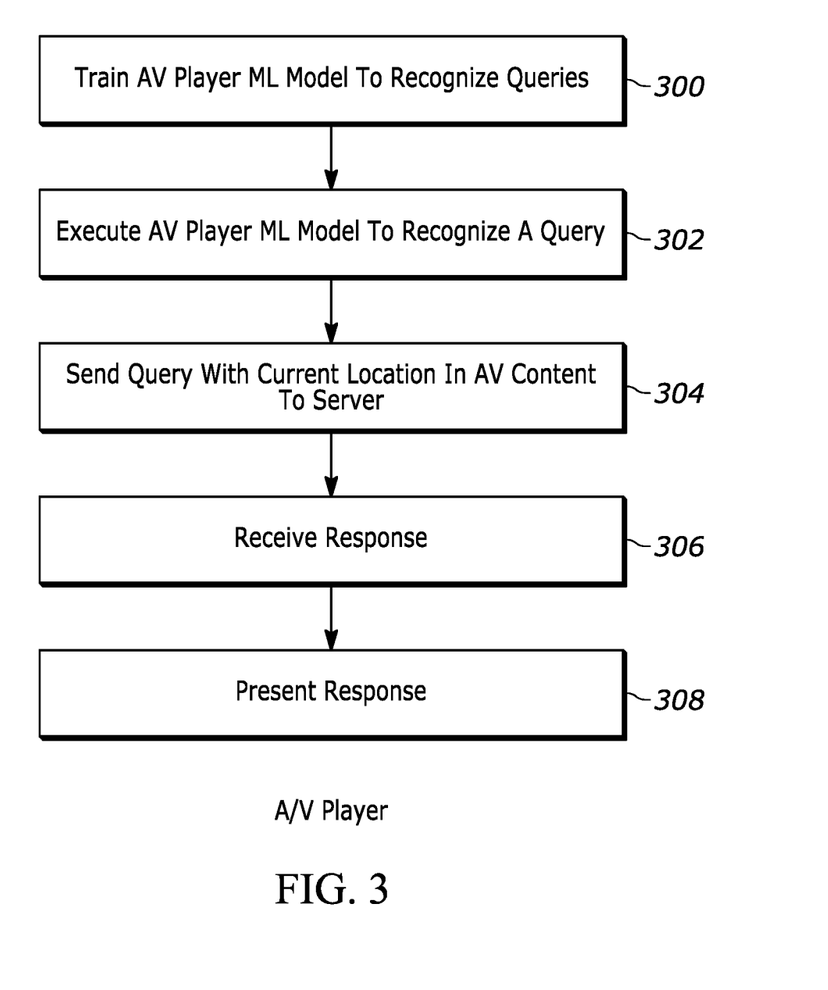
FIG. 3 illustrates example AV player logic in example flow chart format consistent with present principles.

FIG. 3 illustrates logic that may be undertaken by the user system by first training the user system ML model 210 in FIG. 2 to recognize queries. This may be done by training the model on a training set of phrases with ground truth indicating for each phrase whether it is a query or not.

Moving to block 302 after training, input is received at the user system which is sent to the ML model 210 to recognize as a query or not. If the input is recognized as a query, typically relating to AV content being presented on the user system 200, the query is sent at block 304 to the server 216, along with the identity of the AV content and current location at which the user is in the AV content. A response is received back at block 306 and presented on the user system audible and/or visibly and/or haptically at block 308.

Figure 4:
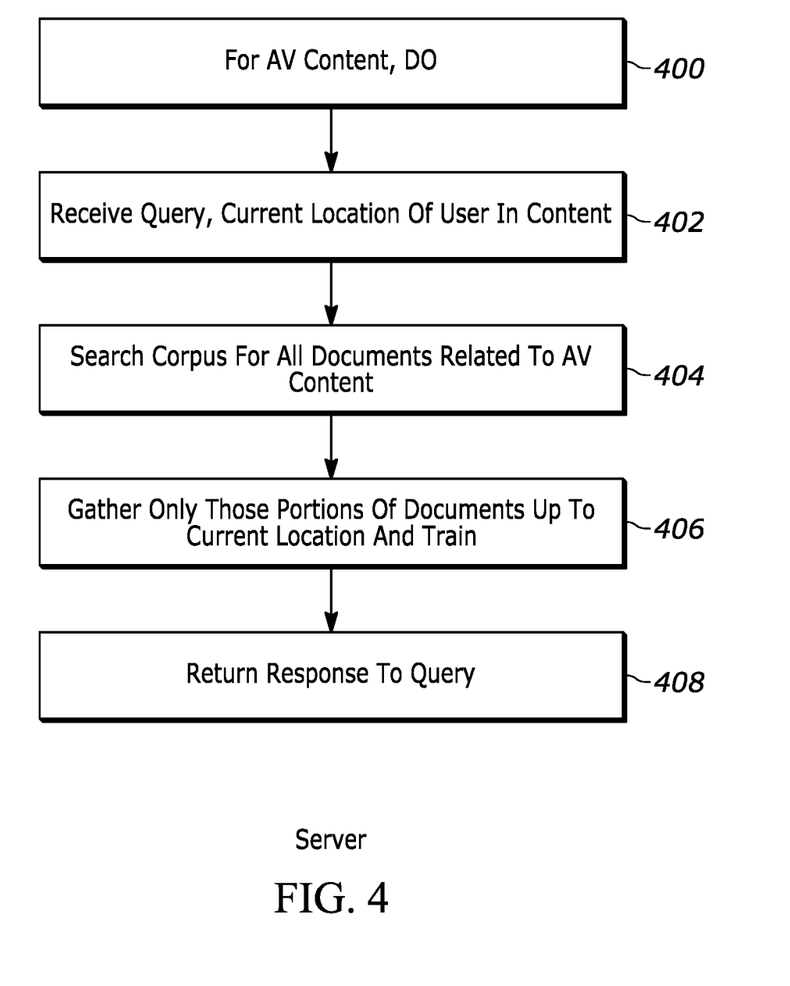
FIG. 4 illustrates first example server logic in example flow chart format consistent with present principles.

Turn now to FIG. 4 for a first example of how the server 216 can response to a query. A do loop is entered at block 400 for a particular piece of AV content in which the query (which includes identification of the AV content to which it pertains) and current location are received at block 402 from the user system.

Proceeding to block 404, the server searches the corpus 224 shown in FIG. 2 for all documents related to the AV content. However, moving to block 406 in the example of FIG. 4, only those portions of documents relating to the AV content up to the current location are gathered and the ML model 220 of the server 216 trained on the gathered portions. Once trained, the ML model 220 generates a conversation-like response to the query and returns the response at block 408 to the user system.

Figure 5:
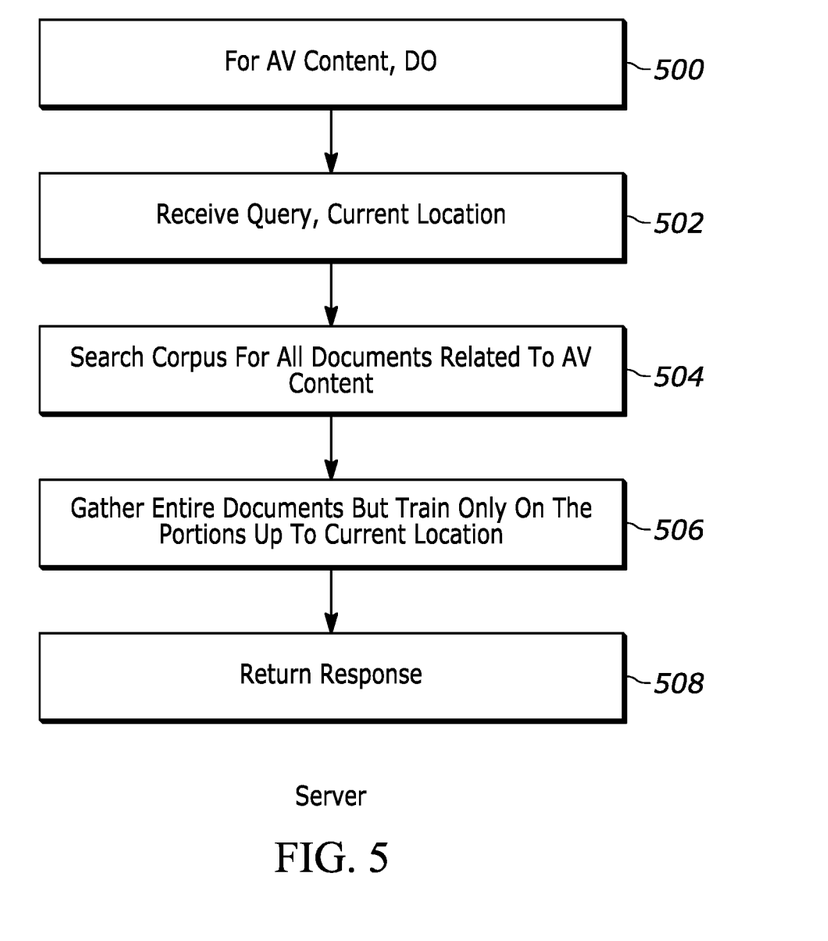
FIG. 5 illustrates second example server logic in example flow chart format consistent with present principles.

FIG. 5 illustrates an alternate technique for responding to the query. A do loop is entered at block 500 for a particular piece of AV content in which the query and current location are received at block 502 from the user system.

Proceeding to block 504, the server searches the corpus 224 shown in FIG. 2 for all documents related to the AV content. Moving to block 506 in the example of FIG. 5, entire documents are gathered by the server but only those portions of documents relating to the AV content up to the current location are used to train the ML model 220 of the server 216. Once trained, the ML model 220 generates a conversation-like response to the query and returns the response at block 508 to the user system.

Figure 6:
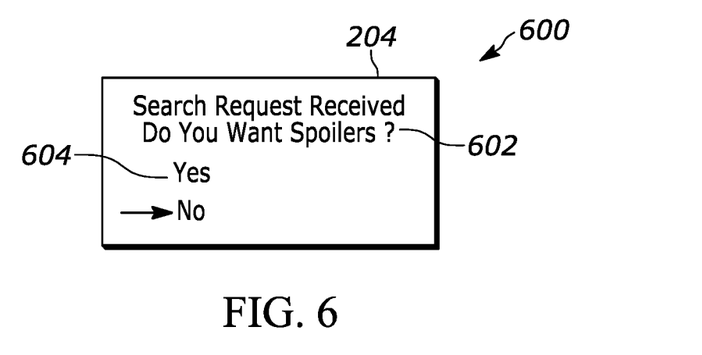
FIG. 6 illustrates an example screen shot that may be presented by the user system in examples embodiments.

FIG. 6 illustrates an additional feature in which a user interface (UI) 600 may be presented on the user system display 204 to prompt at 602 whether the user wishes query responses to include spoiler information, i.e., information pertaining to portions of the AV program after the current location. Selectors 604 may be provided to enable the user to select whether to include spoiler information or not.

Figure 7:
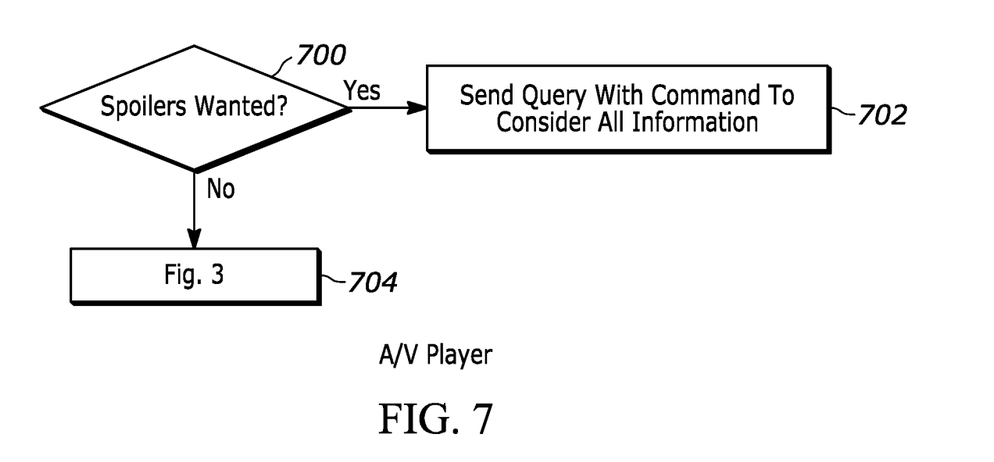
FIG. 7 illustrates first example user system logic in example flow chart format consistent with FIG. 6.

FIG. 7 illustrates user system logic that may be executed by the AV player 202 shown in FIG. 2 consistent with the UI 600 of FIG. 6. If spoilers are desired as determined at state 700, when a query is received it is sent to the server 216 at block 702 with a command for the server to train the chatbot on all available information pertaining to the AV content. If spoilers are not desired the logic invokes FIG. 3 at state 704.

Figure 8:
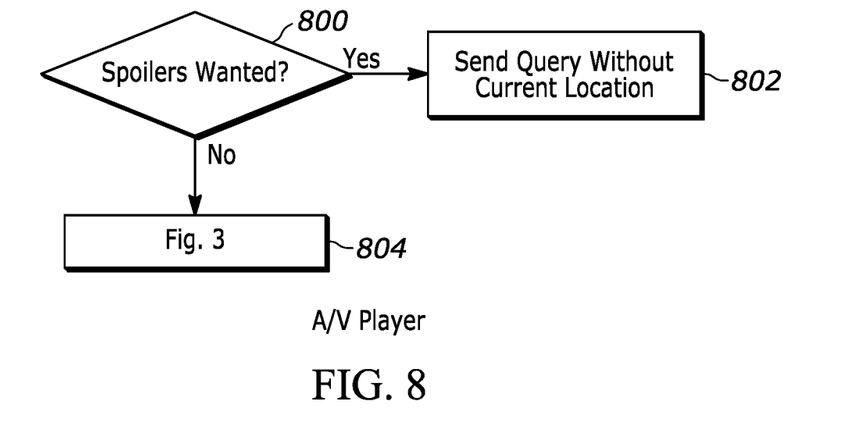
FIG. 8 illustrates second example user system logic in example flow chart format consistent with FIG. 6.

FIG. 8 illustrates an alternative technique for the user system to handle spoilers. If spoilers are desired as determined at state 800, when a query is received, it is sent to the server 216 at block 802 but without any current location indication, such that the server will train the chatbot on all available information pertaining to the AV content. If spoilers are not desired the logic invokes FIG. 3 at state 804.

Figure 9:
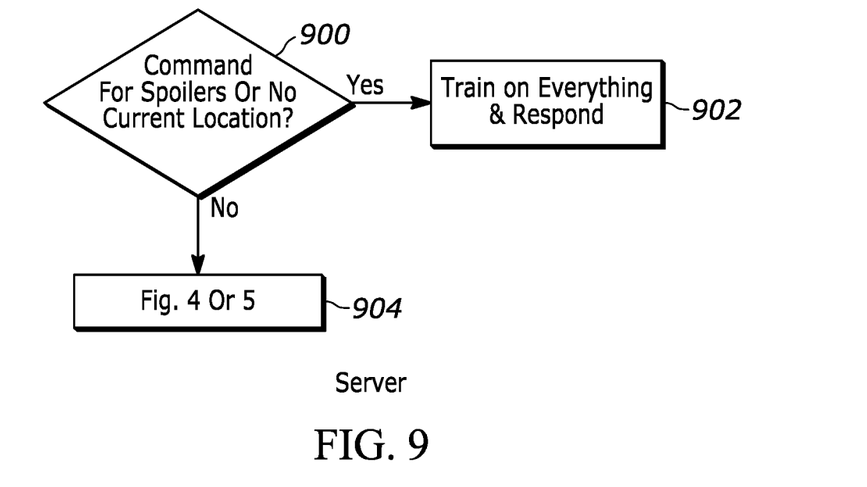
FIG. 9 illustrates example server logic in example flow chart format consistent with FIG. 6.

FIG. 9 illustrates server-side logic consistent with FIGS. 7-9. If a command is received at state 900 to train on all available documents pertaining to the AV content associated with the query or, equivalently, no current location is received with the query, the server trains its chatbot at block 902 on all available content to return a response to the query. However, if state 900 indicates that a response should contain no spoilers, the server may execute the logic of FIG. 4 or 5 at state 904.

Figure 10:
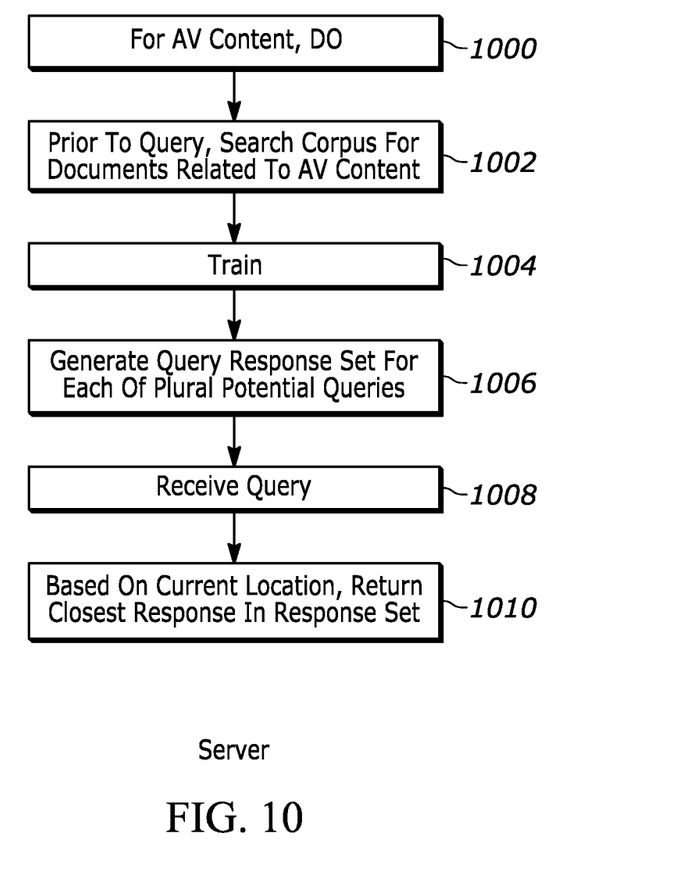
FIG. 10 illustrates alternate example server logic in example flow chart format consistent with present principles.

FIG. 10 illustrates alternate pre-query logic the server may execute to train a chatbot before any queries are received. For a selected piece of AV content at block 1000, prior to the query, at block 1002 the corpus is searched for documents related to the AV content from block 1000. The ML model 220 of the server is trained at block 1004 on the documents.

Moving to block 1006, the ML model 220 is executed to generate a set of responses for each of plural candidate queries. Each set of responses for each candidate query includes plural responses and each of the plural responses corresponds to a respective location in the AV content. It is to be understood that each respective location is a location in a sequence of terms and/or sounds and/or images in the AV content.

At block 1008, after training a query is received along with the indication of the current location. Moving to block 1010 a respective response is selected from a respective set of responses for the closest query matching the user's query and corresponding to a location closest to the current location indicated by the user system.

With respect to the training corpus, text such as the text of the printed version of the book may be used for audiobooks. Closed captioning of video also may be used, as well as scripts of video screenplay. Dialogue also may be used as recognized from audio associated with books or movies. The tone of the dialogue may undergo sentiment analysis in order to glean details from the spoken speech. Thus, training may be multi-modal-incorporating not only text (if available), but also speech-to-text, and video.

Training and/or query responses may follow along with the listener or viewer in realtime as the listener or viewer consumes the content, and create a corpus of material to examine with a large language model. In this way, if closed captioning was not available, speech-to-text can be used on any dialogue and audio description (if available). Text can also be used to find entry-points in printed text to know where the playback location is in the printed version of the content.

The ML model may be executed on the user's local computer, mobile phone, or as part of the player application.

It will be appreciated that whilst present principals have been described with reference to some example embodiments, these are not intended to be limiting, and that various alternative arrangements may be used to implement the subject matter claimed herein.

What is claimed is:

1. An apparatus, comprising:
at least one server; and
at least one computer memory that is not a transitory signal and that comprises instructions executable by at least one processor system to:
receive at least one query related to audio video (AV) content that is being presented at a device;
responsive to receipt of the query, present, on a display of a user system, a user interface (UI), the UI comprising a prompt with text asking, in question format, whether a user wishes for one or more query responses to include spoiler information, the UI comprising a first selector that is selectable to provide a command to not provide one or more query responses with spoiler information, the UI comprising a second selector that is selectable to provide a command to provide one or more query responses with spoiler information;
based on selection of the first selector, send the query to the at least one server along with an indication of a current playback location in the AV content;
based on selection of the second selector, send the query to the at least one server without an indication of a current playback location in the AV content; and
receive, from at least one machine learning (ML) model executing at the at least one server, a response to the query, the response containing one of: information about the AV content only up to the current playback location based on the first selector being selected, and information pertaining to portions of the AV content after the current playback location based on the second selector being selected, wherein the at least one server comprising: at least one processor system configured to:
receive the query and the indication of the current playback location;
execute the ML model to generate the response containing information about the AV content only up to the current playback location based on the first selector being selected;
prior to receipt of the query: search a corpus of documents for information related to the AV content;
gather documents in the corpus relating to the AV content;
train the ML model on the documents in the corpus relating to the AV content; and execute the ML model to generate a set of responses for each candidate query of plural candidate queries, each respective set of responses comprising plural responses, each plural response of the plural responses corresponding to a respective playback location in the AV content, each respective playback location being a playback location in a sequence of terms and/or sounds and/or images in the AV content;
retrieve, based on the first selector being selected, a respective response from the respective set of responses for a candidate query most closely matching the query and the current playback location; and
returning the respective response to the user system.

2. The apparatus of claim 1, wherein the processor system of the at least one server is configured to:
responsive to receipt of the query, search a corpus of documents for information related to the AV content;
gather only portions of documents in the corpus relating to the AV content up to the current playback location;
train the ML model on the portions of documents in the corpus relating to the AV content up to the current playback location; and
execute the ML model to generate the response based on the first selector being selected.

3. The apparatus of claim 1, wherein the processor system of the at least one server is configured to:
responsive to receipt of the query, search a corpus of documents for information related to the AV content;
gather documents in the corpus relating to the AV content;
train the ML model on the documents in the corpus relating to the AV content; and
execute the ML model to generate the response using only portions of the documents up to the current playback location based on the first selector being selected.

4. The apparatus of claim 3, wherein the processor system of the at least one server is configured to train the ML model using only portions of the documents up to the current playback location.

5. The apparatus of claim 1, wherein the ML model comprises at least one generative pre-training transformer.

6. The apparatus of claim 1, wherein the instructions are executable to:
train the ML model for responding to queries based on different playback positions, the ML model trained on a printed version of a book for which there is an audio book establishing the AV content.

7. The apparatus of claim 1, wherein the instructions are executable to:
train the ML model for responding to queries based on different playback positions, the ML model trained on a closed captioning data.

8. The apparatus of claim 1, wherein the instructions are executable to:
train the ML model for responding to queries based on different playback positions, the ML model trained on a scripts of video screenplay.

9. The apparatus of claim 1, wherein the instructions are executable to:
train the ML model for responding to queries based on different playback positions, the ML model trained on dialogue as recognized from audio associated with one or more audiobooks.

10. The apparatus of claim 9, wherein the instructions are executable to:
execute sentiment analysis to identify training data from spoken speech indicated in the audio.

11. The apparatus of claim 1, wherein the instructions are executable to:
train the ML model for responding to queries based on different playback positions, the ML model trained on multi-modal data.

12. A method, comprising:
receiving at least one query related to audio video (AV) content that is being presented at a device;
responsive to receipt of the query, presenting, on a display of a user system, a user interface (UI), the UI comprising a prompt regarding whether a user wishes one or more query responses to include spoiler information, the UI comprising a first selector that is selectable to provide a command to not provide one or more query responses with spoiler information, the UI comprising a second selector that is selectable to provide a command to provide one or more query responses with spoiler information;

based on selection of the first selector, sending the query and a current playback location in the AV content to at least one server on a wide area network;

based on selection of the second selector, send the query to the at least one server without an indication of a current playback location in the AV content; and presenting a response from at least one the server to the query, based on selection of the first selector or the second selector, the response comprising one of: information about the AV content only up to the current playback location based on the first selector being selected, and information pertaining to portions of the AV content after the current playback location based on the second selector being selected;

receiving, at the at least one server, the query and the indication of the current playback location;

executing, at the at least one server, a machine learning (ML) model to generate the response containing information about the AV content only up to the current playback location;

returning the response to the device;

prior to receipt of the query: searching, by a processor of the at least one server, a corpus of documents for information related to the AV content;

gathering, by the processor of the at least one server, documents in the corpus relating to the AV content;

training, by the processor of the at least one server, the ML model on the documents in the corpus relating to the AV content; and executing, by the processor of the at least one server, the ML model to generate a set of responses for each plural candidate query of plural candidate queries, each respective set of responses comprising plural responses, each plural response of the plural responses corresponding to a respective playback location in the AV content, each respective playback location being a playback location in a sequence of terms and/or sounds and/or images in the AV content;

retrieving, based on the first selector being selected, a respective response from the respective set of responses for a candidate query most closely matching the query and the current playback location; and returning the respective response to the user system.

13. The method of claim 12, wherein the prompt comprises text asking, in question format, whether the user wishes for one or more query responses to include spoiler information.

14. An apparatus comprising:
at least one processor system configured to:
receive at least one query related to audio video (AV) content that is being presented at a device;

responsive to receipt of the query, present, on a display of a user system, a user interface (UI), the UI comprising a prompt regarding whether a user wishes one or more query responses to include spoiler information, the UI comprising a first selector that is selectable to provide a command to not provide one or more query responses with spoiler information, the UI comprising a second selector that is selectable to provide a command to provide one or more query responses with spoiler information;

based on selection of the first selector, execute a machine learning (ML) model to generate a first response containing information about the AV content only up to a current playback location;

based on selection of the second selector, execute the ML model to generate a second response containing information about the AV content after the current playback location and return, based on selection of the first selector or second selector, the first response or second response to the user system;

prior to receipt of the query: search a corpus of documents for information related to the AV content;

gather documents in the corpus relating to the AV content;

train the ML model on the documents in the corpus relating to the AV content;

execute the ML model to generate a set of responses for each plural candidate query of plural candidate queries, each respective set of responses comprising plural responses, each plural response of the plural responses corresponding to a respective playback location in the AV content, each respective playback location being a playback location in a sequence of terms and/or sounds and/or images in the AV content;

receive the query and the indication of the current playback location;

retrieve, based on the first selector being selected, a respective response from the respective set of responses for a candidate query most closely matching the query and the current playback location; and returning the respective response to the user system.

15. The apparatus of claim 14, wherein the prompt comprises text asking whether the user wishes for one or more query responses to include spoiler information.

* * * * *